No. 877,665. PATENTED JAN. 28, 1908.
F. SAWYER.
EVAPORATOR.
APPLICATION FILED JULY 1, 1907.
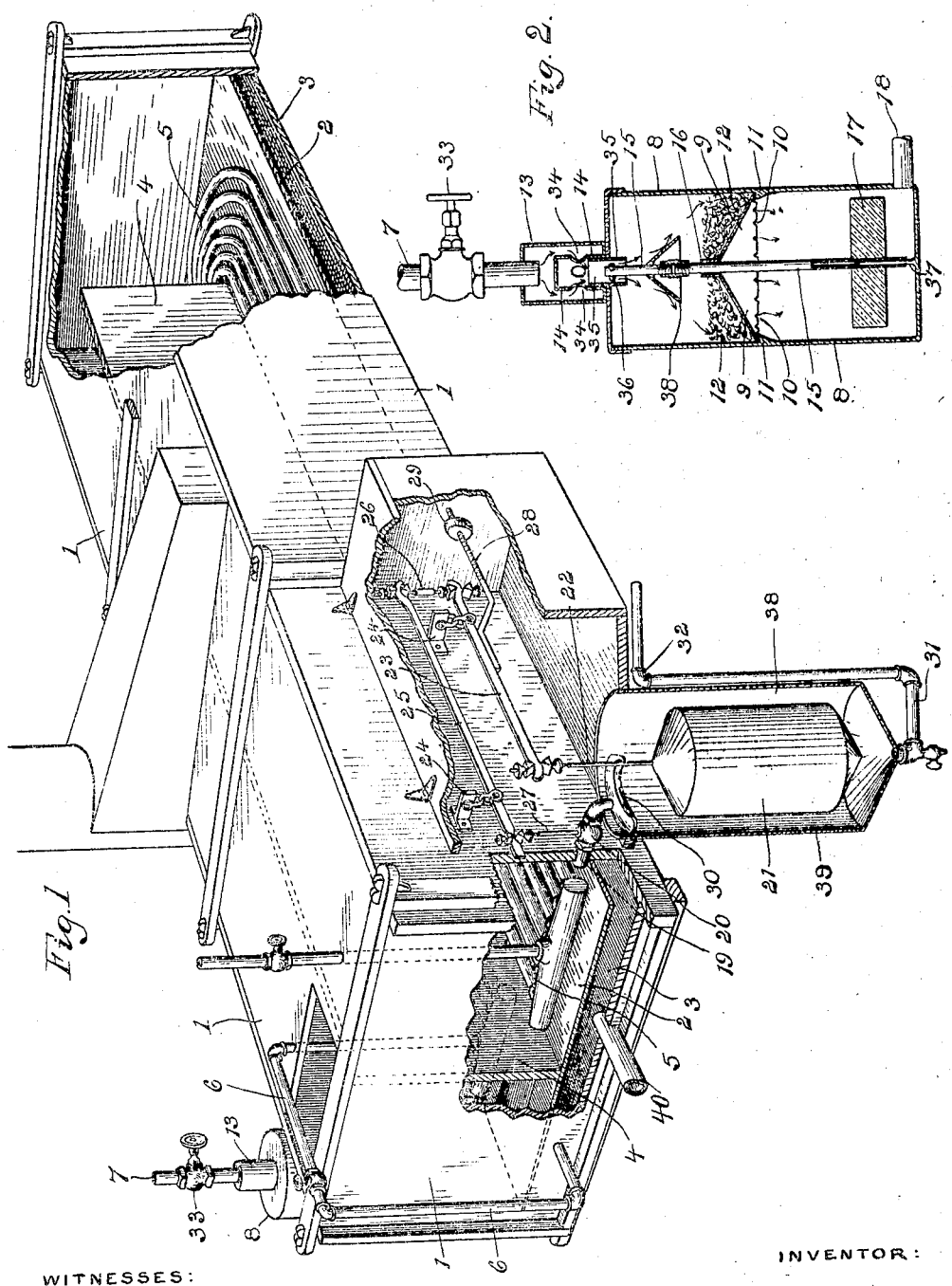
WITNESSES:
Anna M. Dow
Anna M. Mayer
INVENTOR:
Floyd Sawyer
By Barthel & Barthel
Attorneys.

UNITED STATES PATENT OFFICE.

FLOYD SAWYER, OF BRIGHTON, MICHIGAN.

EVAPORATOR.

No. 877,665.  Specification of Letters Patent.  Patented Jan. 28, 1908.

Application filed July 1, 1907. Serial No. 381,627.

*To all whom it may concern:*

Be it known that I, FLOYD SAWYER, a citizen of the United States of America, residing at Brighton, in the county of Livingston and State of Michigan, have invented certain new and useful Improvements in Evaporators, of which the following is a specification, reference being had therein to the accompanying drawings.

This relates to an evaporating apparatus for defecating or concentrating fruit and cane juices, and the like, and especially to a continuous process evaporator provided with means for utilizing both live and exhaust steam for heating purposes and also with automatic regulating devices for keeping a constant level of liquid flowing through the apparatus, and for maintaining a constant predetermined specific gravity in the outflowing product.

Referring to the drawings, Figure 1 is a view in perspective, parts being broken away to give clear view, of an evaporator embodying the features of the invention. Fig. 2 is a view in a vertical, central section through a feed or supply valve regulator and controller.

In the drawings, 1 represents the main body of a tank, preferably rectangular in shape, and of any desired and suitable construction which provides a false bottom 2 of sheet metal usually of copper, parallel to and a short distance above the tank bottom 3. A central partition 4, extending the greater portion of the length of the tank, divides it into two compartments communicating with each other around the farther end of the partition. These are heated by a flat U-coil 5 of steam pipes supported on the false bottom 2 and provided with the usual steam control fittings at convenient points. An exhaust pipe 6 from the coils is so disposed, as to discharge into one end of the tank, between the tank bottoms. Any other available exhaust steam in the vicinity of the apparatus may also be led into the tank between the bottoms, through the pipe 40.

The fruit, sugar sap or cane juice to be defecated or reduced, is delivered to one end of one compartment of the tank by a supply pipe 7 whose end section is downturned, a gate or valve 33 of ordinary pattern being inserted to cut off the flow when the apparatus is not in use. The lower end of this supply pipe extends into a combined gage and filter chamber 8 secured on the side of the tank by suitable means.

The chamber, in its preferred form, is a vertical cylinder divided by a cross-partition or filter bed bottom 9, which is a cone of gauze or the like, or imperforate metal, its edges having notches 10 which allow free egress to the liquid. This cone rests on lugs 11 on the cylinder wall, being thus readily removable for cleaning, and carries a bed 12 of excelsior or other like filtrant. A cylindrical valve casing 13, is concentrically secured on the end of the supply pipe 7, in axial alinement therewith. A tubular valve seat 14 projects upwardly from the bottom of this casing, its upper end being closed, and having apertures 34 formed in its periphery. A cylindrical hollow closure 35 is axially reciprocable in the seat, and is carried by an upright stem 15, preferably tubular, to which it is secured by a cross-pin 36. Said stem passes through a suitable guide 16 at the apex of the cone filter bottom 9, and is supported by a float 17 of proper construction in the lower compartment, the stem being extended through the float and having sliding engagement on an upright pin 37 whereby it is held in alinement. Suitable screw-threaded connections between the valve closure and stem admits of any required adjustment.

As a detail of construction, it is advisable to have a conical deflector 38 on the stem to diffuse the incoming stream over the filter bed and away from the stem and guide glands. A pipe 18 leads from the bottom of the chamber into the tank below the desired working level of the contents of the tank, so that the float in the chamber operates the valve and controls the supply automatically in an obvious manner.

A discharge pipe 19 leads from the bottom of the other compartment, to an outlet valve 20, which discharges over the top of an upright cylindrical regulating tank 39. A cylindrical float 21, with conical ends, is suspended in this regulating tank by a vertical, axial stem 22, whose upper end is hung on the power arm of the lower limb 23 of a compound lever, of the first class, fulcrumed on suitable brackets 24 on the side of the main tank, the upper limb 25 being articulated by a link 26 to the load end of the lower limb, and, in turn, being operatively articulated at its load end to the stem 27 of the outlet valve 20, which latter may be of any construction which operates readily in viscous liquids. Any suitable form of spring stop may be provided for checking the scale levers to prevent the valve 20 from going way shut or open as the gravity of the product varies.

The bearings of the levers and connections are of the knife edge or scale type, preferably, to insure readiness and lightness of action, and a counterpoise arm 28 on the lower limb with counterpoise weight 29 adjustably secured thereon further increases the sensitiveness of the regulator.

To prevent the incoming stream from the outlet valve 20 falling upon the top of the float 21 and disturbing it or checking its action, a deflecting plate 30 is provided, which divides the stream and diverts it against the inner sides of the regulating tank at different points.

The bottom of the tank is coned to correspond to the lower end of the float 21, and an outlet pipe 31 extends upwardly from the apex to the level which it is desired to maintain in the tank where an elbow 32 defines the level and forms a convenient outlet for the product.

It is to be understood that all the necessary pipe fittings, skimming sluiceways, defecating chambers and other necessary appurtenances which do not *per se* form a part of the invention, are provided.

In the initial stage of the operation, the liquid to be reduced, concentrated or defecated, is turned into the tank through the filter chamber, filling the apparatus to the level determined by the float in the filter chamber, the regulating float in the regulating tank being weighted at its lower end, and its counterpoise adjusted so that the outlet valve is closed. The steam is then turned into the coils and the exhaust between the tank bottoms, thus rapidly heating and evaporating the liquid. When the latter has approached the consistency desired, the outlet valve is opened by raising the levers by hand, until the regulating tank is full and the float therein partially buoyed up by the liquid; the liquid gradually trickles through the valve in the regulating tank, increasing in density until it raises the float to its proper height, as the latter is adjusted after the manner of a specific gravity bulb, to float or rise to a certain point when a predetermined density or specific gravity in the liquid in which it is immersed, is reached. Thereafter the operation is continuous and automatic. As the density of the liquid increases to the point where the regulating float fully opens the outlet valve, it is drawn off rapidly, and the consequent drop in the main tank level causes the filter chamber float to lower and so open the supply valve. The incoming liquid is thus received at one end of the tank, is directed over the full length of the coils and false bottom, and gradually reduced as it approaches the outlet valve, through which it is discharged only so fast as it reaches the required density or is sufficiently reduced, without direct attention on the part of the operator.

One of the features of the invention is the disposition of parts of the filter chamber and its float controlled valve which are so arranged as to work readily without clogging or binding, the float stem working in widely separated end bearings which hold it in alinement with the valve casing and seat, while the filter bed and bottom are easily removed for renewal and cleaning.

Another feature is the arrangement of the heating means whereby the liquid is in contact throughout its passage with a great extent of heating surface and whereby the fullest heating power of the steam in the system is utilized and other waste steam from different sources made available.

Another feature is the arrangement of the regulating device. The specific gravity float may be made large enough to work the outlet valve easily. It is so hung as to move vertically at all times without contacting with the sides of its tank. Its lever connections with the outlet valve are delicate, while durable, thus insuring sensitiveness in action and the counterpoise thereon permits regulation of the float so that it will operate to obtain any desired density of products.

Because of these features of accurate adjustments and sensitiveness of action, the apparatus produces a uniform product, regardless of changes or fluctuations in the heat supplied, the automatic control responding quickly and holding the contents of the tank until evaporated to the proper consistency.

What I claim as my invention is:—

1. In an evaporating apparatus having an evaporating tank and an outlet valve means adapted to automatically close the outlet valve when the specific gravity of the liquid falls below a predetermined point, comprising a regulating tank into which the outlet valve discharges, a cylindrical specific gravity float suspended by an axial stem in the contents of the tank and compound lever connections between the valve and float stem adapted to close the valve when the float falls.

2. In an evaporating apparatus, an outlet valve, from the evaporating tank and means adapted to automatically close the outlet valve when the specific gravity of the liquid falls below a predetermined point, consisting of a regulating tank into which the outlet valve discharges a specific gravity float immersed in the contents of the tank operatively connected by levers to the valve, and a counterpoise adjustable on the lever, adapted to change the buoyancy of the float whereby the float falls when the specific gravity falls below the predetermined point.

3. In a continuous process evaporating apparatus, an outlet valve from the evaporating tank, a regulating tank into which the outlet valve discharges and in which the concentrated liquid is maintained at a constant level, a specific gravity float immersed in the liquid in said regulating tank, operatively connected to the outlet valve, and adapted to close said valve when the specific gravity of the liquid falls below a predetermined point.

4. In an evaporating apparatus, a regulator tank, an outlet valve from the evaporating tank discharging into the regulator tank, means for maintaining a constant level of concentrated liquid in the regulator tank, a specific gravity float immersed in the contents of the regulator tank, a compound lever fulcrumed on the evaporator tank operatively connected to the outlet valve and a stem secured to the float pivoted on the power arm of the lever, said float and lever connections being adapted to close the valve when the float settles.

5. In an evaporating apparatus an upright cylindrical regulator tank, an outlet valve from the evaporating tank discharging into the regulator tank, an upright cylindrical gravity float immersed in the contents of the regulator tank, a compound lever fulcrumed on knife-edge scale bearings on the evaporator tank and operatively connected to the outlet valve, and an axial stem secured on the float pivoted on the power arm of the lever, said float and lever connections being adapted to close the valve when the float settles.

6. In an evaporating apparatus an upright cylindrical regulator tank, an outlet valve from the evaporating tank discharging into the regulator tank, an apron distributing the flow from the valve against the sides of the tank, an upright cylindrical specific gravity float immersed in the contents of the regulator tank, a compound lever fulcrumed on knife edge scale bearings on the evaporator tank operatively connected to the outlet valve and an axial stem secured to the float, pivoted on the power arm of the lever, said float and lever connections being adapted to close the valve when the float settles.

7. In an evaporating apparatus, an upright cylindrical regulator tank, an outlet valve from the evaporating tank discharging into the regulator tank, an apron distributing the flow from the valve against the sides of the tank, a discharge pipe from the bottom of the regulator tank having a discharge mouth in the plane of the level of the liquid to be maintained in the tank, an upright cylindrical specific gravity float immersed in the contents of the regulator tank, a compound lever fulcrumed on knife edge scale bearings on the evaporator tank operatively connected to the outlet valve and an axial stem secured to the float and pivoted on the power arm of the lever, said float and lever connections being adapted to close the valve when the float settles.

8. In an evaporating apparatus having an evaporating tank and outlet therefor, a regulator tank, a valve controlling the outlet, an apron distributing the discharge from the valve around the regulator tank, a lever of the first class fulcrumed on a link hung from the evaporating tank, a stem operating the valve connected by knife edge bearings to the load end of said lever, a second lever of the first class fulcrumed in a link hung from the evaporator tank, a rod having knife bearings at each end articulating the load arm of the second lever to the power arm of the first lever, a float submerged in the contents of the regulator tank and suspended by a stem hung by knife edge bearings on the power arm of the second lever, a weight adjustably secured to the second lever counterbalancing the float, and a discharge from the regulator tank above the float.

9. A continuous process evaporating apparatus comprising an evaporating tank, means for automatically supplying the tank comprising an inlet pipe, a filter chamber, a supply valve on the inlet pipe discharging into the chamber, a float adapted to operate the valve vertically movable in the chamber below the filter bed, a pipe connecting the filter chamber and evaporating tank, and an automatic discharging means for the evaporator.

10. A continuous process evaporating apparatus, comprising an evaporating tank, means for automatically controlling the supply for the tank comprising an upright cylindrical chamber, a conical cross-wall in the cylinder, a filter bed on the wall, an inlet pipe over the chamber, a valve casing on the pipe end, a valve closure for the casing seat adjustably secured on a vertical stem longitudinally reciprocable in bearings centrally secured on the conical cross-wall and cylinder bottom, a float below the cross-wall secured on the stem and means adapted to automatically regulate the outflow from the evaporator.

11. A continuous process evaporating apparatus comprising an evaporating tank, means for automatically controlling the supply for the tank comprising an upright cylindrical chamber, a conical cross-wall in the cylinder supported on lugs on the cylinder wall and provided with marginal notches, a filter bed on the wall, an inlet pipe over the chamber, a valve casing on the pipe, a valve closure for the casing seat adjustably secured on a vertical stem longitudinally reciprocable in bearings centrally secured on the conical cross-wall of the cylinder bottom, a float below the cross-wall secured on the stem and means adapted to automatically regulate the outflow from the evaporator.

12. A continuous process evaporating apparatus, comprising an evaporating tank, means for automatically controlling the supply for the tank comprising an upright cylindrical chamber, a conical cross-wall in the cylinder, a filter bed on the wall, an inlet pipe over the chamber, a valve casing on the pipe end, a valve closure for the casing seat, adjustably secured on a vertical stem longitudinally reciprocable in bearings, a float below the cross-wall secured on the stem, and means adapted to automatically regulate the outflow from the evaporator comprising an outlet valve, a specific gravity float immersed in the concentrated liquid discharged by the valve and operative connections between the float and valve adapted to close the valve when the float falls.

In testimony whereof I affix my signature in presence of two witnesses.

FLOYD SAWYER.

Witnesses:
OTTO F. BARTHEL,
C. R. STICKNEY.